United States Patent
Zhao et al.

(10) Patent No.: US 9,139,204 B1
(45) Date of Patent: Sep. 22, 2015

(54) ROAD SURFACE CONDITION DETECTION WITH RECURSIVE ADAPTIVE LEARNING AND VALIDATION

(71) Applicant: GM GLOBAL TECHNOLOGY OPERATIONS LLC, Detroit, MI (US)

(72) Inventors: Qingrong Zhao, Madison Heights, MI (US); Jinsong Wang, Troy, MI (US); Wende Zhang, Troy, MI (US); Bakhtiar Brian Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/302,642

(22) Filed: Jun. 12, 2014

(51) Int. Cl.
| | |
|---|---|
| *G01C 21/00* | (2006.01) |
| *B60W 40/064* | (2012.01) |
| *G06K 9/00* | (2006.01) |
| *G06K 9/62* | (2006.01) |

(52) U.S. Cl.
CPC ......... *B60W 40/064* (2013.01); *G06K 9/00791* (2013.01); *G06K 9/6293* (2013.01)

(58) Field of Classification Search
CPC .................. B60W 2550/12; B60W 2550/141; B60W 2550/20; B60W 2550/14; B60W 40/064; G06F 17/5009; G06F 9/00791; G06F 9/6293; Y02T 10/82
USPC .............................. 701/428; 703/17; 340/901
See application file for complete search history.

(56) References Cited

U.S. PATENT DOCUMENTS 8,744,822 B2 * 6/2014 Mewes et al. ................. 703/6

OTHER PUBLICATIONS

Tomoaki Teshima, Hideo Saito, "Classification of Wet/Dry Area Based on the Mahalanobis Distance of Feature from Time Space Image Analysis", MVA 2009 IAPR Conference on Machine Vision Applications, May 20-22, 2009, Yokohama, Japan.

* cited by examiner

*Primary Examiner* — Gertrude Arthur Jeanglaude

(57) ABSTRACT

A method of determining a road surface condition for a vehicle driving on a road. Probabilities associated with a plurality of road surface conditions based on an image of a capture scene are determined by a first probability module. Probabilities associated with the plurality of road surface conditions based on vehicle operating data are determined by a second probability module. The probabilities determined by the first and second probability modules are input to a data fusion unit for fusing the probabilities and determining a road surface condition. A refined probability is output from the data fusion unit that is a function of the fused first and second probabilities. The refined probability from the data fusion unit is provided to an adaptive learning unit. The adaptive learning unit generates output commands that refine tunable parameters of at least the first probability and second probability modules for determining the respective probabilities.

28 Claims, 3 Drawing Sheets

ROAD SURFACE CONDITION DETECTION WITH RECURSIVE ADAPTIVE LEARNING AND VALIDATION

BACKGROUND OF INVENTION

An embodiment relates to detection of a road surface condition using adaptive learning techniques.

Precipitation on driving surface causes several different issues for a vehicle. For example, water or snow on a road reduces the coefficient of friction between the tires of the vehicle and the surface of the road resulting in vehicle stability issues.

Various techniques are known for attempting to determine what the environmental condition of the road surface is. An example of one such technique is a vehicle model that senses vehicle operating conditions to obtain data for classifying a road surface condition. The model has set parameters and without any updates, the model would yield the same results for a given input. Therefore, if the model misdiagnoses the road surface condition, then the output will continuously generate the same incorrect result.

Other approaches, such as an image-based approach, utilize a classifier to determine the road surface condition. However, if the classifier is not updated, then the classifier will output the same result even if it is incorrect.

In such cases, the road surface detection system is entirely dependent on the classifier or model stored in the vehicle when the vehicle was manufactured or brought in for a service update.

SUMMARY OF INVENTION

An advantage of an embodiment is the cooperative use of data from two respective estimation techniques for outputting a probability of the road surface condition. A further advantage is an online adaptive learning technique wherein the output of the online adaptive learning technique is provided as feedback to the two respective estimation techniques for refining parameters within each technique. This allows each estimation technique to adaptively learn from each analysis into parameters used by each technique. As a result, the estimations generated may be validated which identifies whether the techniques are correctly analyzing the data or whether adjustments are required.

An embodiment contemplates a method of determining a road surface condition for a vehicle driving on a road. Probabilities associated with a plurality of road surface conditions based on an image of a capture scene of the road are determined by a first probability module. Probabilities associated with the plurality of road surface conditions based on vehicle operating data are determined by a second probability module. The probabilities determined by the first and second probability modules are input to a data fusion and decision making unit for fusing the probabilities determined by the first and second probability modules. Determining a road surface condition based on fused results by the data fusion and decision making unit. A refined probability associated with the identified road surface condition is output from the data fusion and decision unit that is a function of the fused first and second probabilities. The refined probability from the data fusion and decision making unit is provided to an adaptive learning unit. The adaptive learning unit generates output commands that refine tunable parameters of at least the first probability module and the second probability module for determining the respective probabilities.

DETAILED DESCRIPTION

Figure 1:
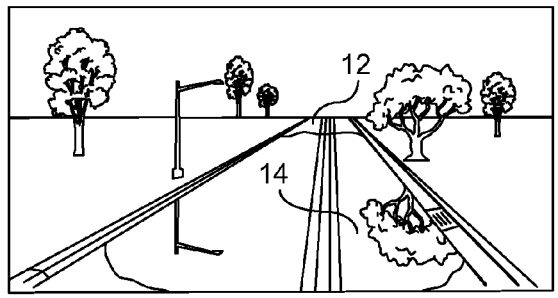
FIG. 1 is an exemplary image captured by an image capture device.

There is shown in FIG. 1, an image is captured exterior of the vehicle traveling along a vehicle road 12. Precipitation 14 is shown disposed on the road 12 and is often displaced by vehicle tires as a vehicle tires rotate over the wet vehicle road 12. It is often advantageous to know beforehand when the vehicle will be traveling along the wet vehicle road 12 so that issues resulting from precipitation, such as loss attraction can be negated or at least mitigated.

Precipitation 14 on the vehicle road 12 can result in a reduction of traction when driving on the wet surface. It should be understood the term precipitation as used herein may include, but is not limited to, water, ice, or snow. The precipitation disposed on the vehicle road 12 lowers the coefficient of friction between the vehicle tires and the vehicle road 12. As a result, traction between the vehicle tires and the vehicle road 12 is lowered. Loss attraction can be mitigated by warning the driver to lower the vehicle speed to one that is conducive to the environmental conditions; actuating automatic application of vehicle brakes using a variable braking force to minimize the precipitation formed on the braking surfaces of the braking components; deactivating or restricting the activation of cruise control functionality while precipitation is detected; or notification to the driver to maintain a greater stopping distance to a lead vehicle.

Figure 2:
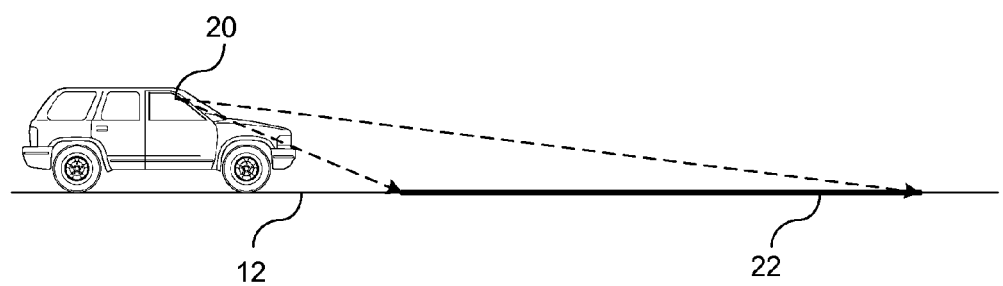
FIG. 2 is a pictorial illustration of a vehicle capturing a wet road surface condition.

FIG. 2 illustrates a pictorial illustration of how reflective properties may be used to determine whether precipitation in the form of water, ice, or snow is present on the surface of the traveled road utilizing various image analysis techniques. For illustrative purposes herein, precipitation in the form of water will be discussed. As shown in FIG. 2, an image capture device 20 captures the road of travel 12. Water on the road surface may be detected by a mirrored image technique utilizing a captured image. Still water 22 is present on the road surface 12 and a reflection in the still water 22 may be captured by the image capture device 20. The still water 22 on the road functions as a mirror-type surface having reflective properties. To determine whether water is present on the road of travel, real objects captured in the image may be compared to virtual object within the reflection. If the real object and the virtual object are substantially identical, the determination may be made that the surface the road is wet. Various comparison techniques may be used to determine the similarities and differences between the real object in the virtual object.

Another technique for determining a wet road surface in FIG. 2 includes road surface texture analysis. When utilizing this technique, a section of the road is captured and analyzed at subsequent time instances. The texture of the road at the first time instance is compared to the texture of the road at the second time instance. If the texture of the road surface between the first instance and second instance of time vary quite largely, that a determination is made that water residing on the road has been stirred up from vehicles driving over the road. In this instance, a determination is made that the road surface is wet.

Figure 3:
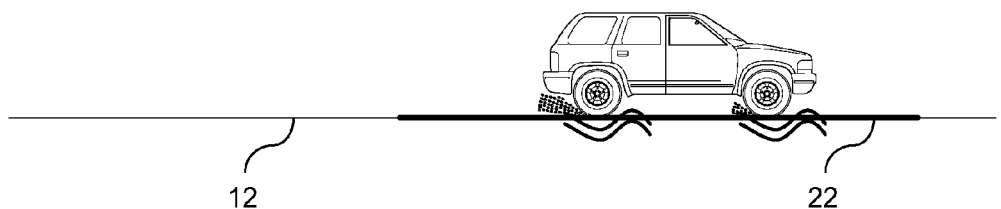
FIG. 3 illustrates a vehicle traveling on a wet road surface condition.

FIG. 3 illustrates another example of determining a road surface condition utilizing a vehicle dynamics approach. The vehicle is shown driving on the vehicle road 12 over a wet road surface 22. The vehicle dynamics can use reference models that include a dry road surface model, a wet road surface model, a snow road surface model, and an icy road surface model. The reference models are preferably pre-categorized reference models. The vehicle dynamics approach utilizes vehicle operational data to estimate tire-road coefficient of friction. Under the vehicle dynamics approach, the vehicle generates an excitation (e.g., steering input, speed input) for obtaining a vehicle operating response. Based on the response of the vehicle, given the excitation, the response is compared with each of the expected responses outputted from all the reference models for determining whether the vehicle is being driven over one of the following road surface conditions that include, but are not limited to, a wet road surface, a dry road surface, a snowy road surface, and an icy road surface.

While the examples in FIGS. 2 and 3 illustrate methods for identifying the road surface condition, both techniques are based on predetermined and fixed classifier or set parameters. That is, both techniques while offering advantages within their unique process are bound by the predetermined parameters set forth by the vehicle model in the pre-existing classifier for the image-based approach.

Figure 4:
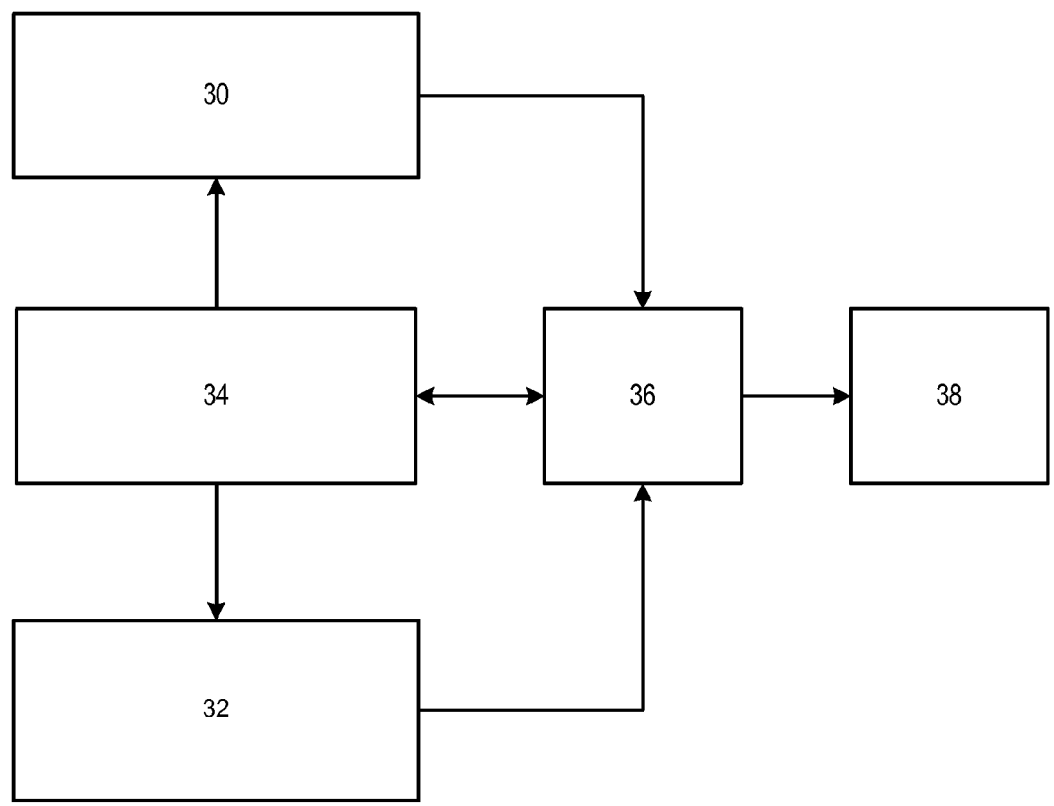
FIG. 4 is a block diagram of a general overview of an online adaptive learning approach.

FIG. 4 illustrates a general overview of an adaptive learning approach where online adaption of a sensing-based module 30 and a vehicle dynamic model module 32 is utilized. Outputs from the sensing-based module 30 and the vehicle dynamic model module 32 each independently identify probabilities associated with a plurality of road surface conditions based on vehicle operation data and an image of a capture scene of the road, respectively. That is, each module will output respective probabilities for each of the plurality of possible road surfaced conditions where the probabilities are based on a comparison between a reference model and sensed data from vehicle excitations or analyzed data from captured images. The plurality of road surface conditions for which probabilities are generated includes, but are not limited to, a dry surface condition, a wet surface condition, a snow surface condition, and an ice surface condition. The outputs from the sensing-based module 30 and the vehicle dynamic model module 32 are fused by a data fusion and decision making module 34 for generating an enhanced probability of the identified road surface condition. The enhanced probability generated by the data fusion and decision making module 34 is fed back to an adaptive learning module 36 which adaptively updates the sensing-based module 30 and the vehicle dynamic model module 32. As a result, the sensing-based module 30 and the vehicle dynamic model module 32 are constantly updated each time a road surface condition is analyzed. Moreover, the enhanced probability from the data fusion and decision making module 34 is provided to an output device 38 which can either enable a safety feature or warn the driver.

Figure 5:
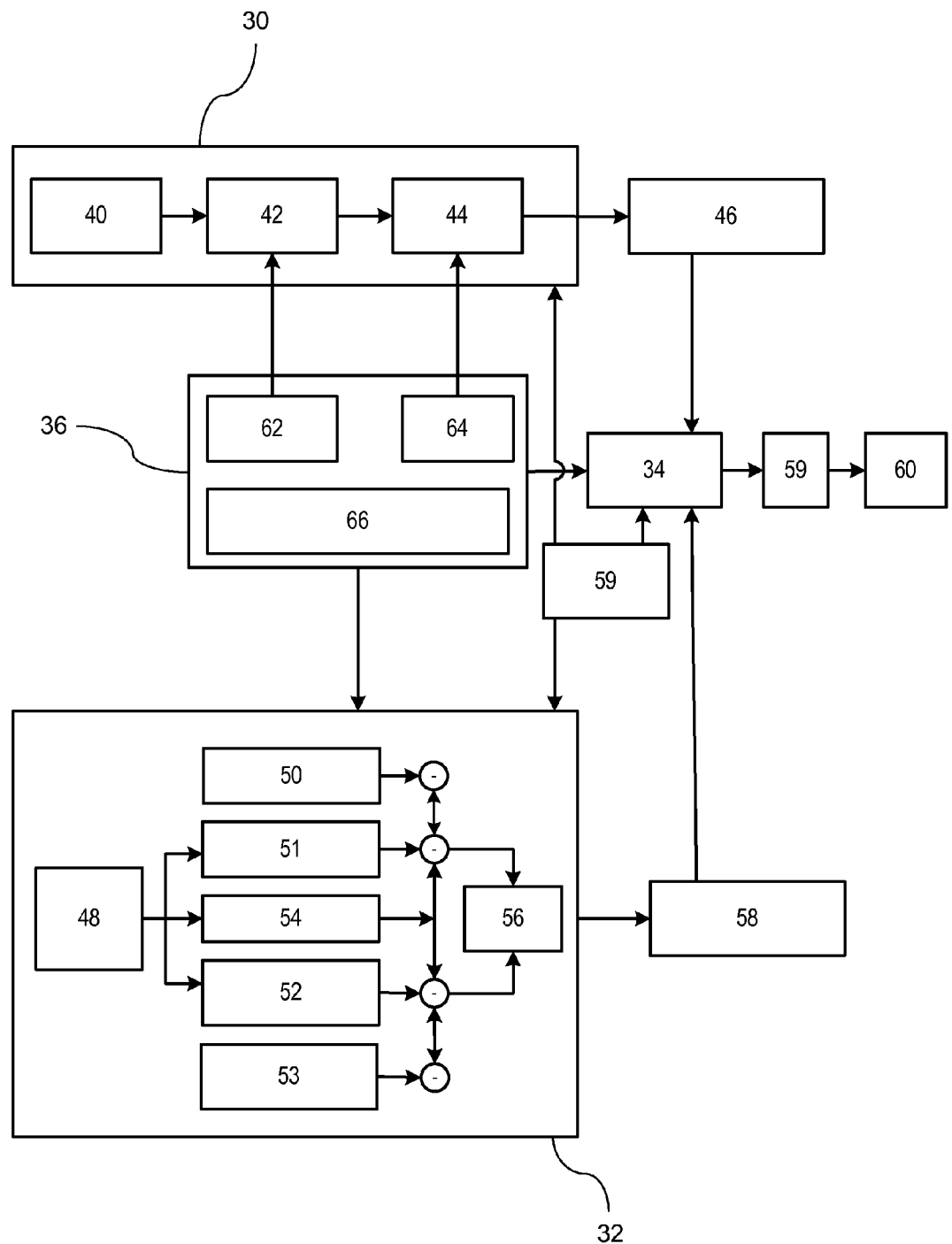
FIG. 5 is a block diagram of an exemplary online adaptive learning approach.

FIG. 5 illustrates an exemplary adaptive learning approach where online adaption of the sensing-based module 30 and the vehicle dynamic model module 32 is utilized. The exemplary illustration shown in FIG. 5 illustrates details of the respective modules shown in FIG. 4; however, it should be understood that the devices, processes, and models are not limited to the specific modules and devices disclosed herein, and the model shown herein is exemplary such that other modules and devices may be used. The sensing-based module 30 includes a sensing device 40, a feature selection module 42, and a classifier 44. The sensing device 40 is mounted on the vehicle for sensing an object forward of the vehicle, or/and can include images to the sides or rear of the vehicle that can be used for determining when some form of precipitation is present on the road or whether the road surface condition is dry. The output from the sensing-based module 30 provides an anticipatory or look-ahead condition of the road to a driver. The sensing device 40 may include, but is not limited to, a camera for capturing images on the road. The function of image capture device is to capture an image that includes the road for analyzing either the reflective image on the road or for analyzing the texture of the road surface for determining the presence of water, ice, or snow on the road of travel. The system may also determine the presence of a dry road condition. The images captured by the image capture device are analyzed for detecting the road surface condition therein. Examples of other sensing devices may include, but are not limited to, cameras, infrared sensors, lidar sensing devices, and radar sensing devices. The feature selection module 42 includes a processor for processing images captured by the image capture device 40. Features within the image are identified (e.g., brightness, color, texture, polarization degree). The identified features are extracted from the image and are provided to a classifier for determining the presence of some form of precipitation on the road surface. Various techniques as described, such as reflection properties or texture analysis, may be used in the selected features in the image.

Each segmented portion can be input to a classifier 44 for analyzing each respective segment and determining whether the respective segment is part of the clear path. The classifier 44 is initially trained by a training program. Once the training is complete, the classifier is obtained. While it is understood that classifiers can be vehicle-based classifiers, or a classifier that is remote from a vehicle that communicates with the vehicle by transmitting data to a remote monitoring center for processing and classification, the classifier 44 used herein is a vehicle-based classifier. The classifier 44 may include, but is not limited to, a support vector machine classifier or a Bayesian classifier. These classifiers classify the condition of the road surface and output a probability percentage 46 representing the probability of each of the possible road surface conditions. Such percentages include probability percentages from a dry road surface condition, a wet road surface condition, a snow road surface condition, and an ice road surface condition. It is also understood that a single classifier that can analyze the data and determine whether the road surface includes a dry, wet, snow, or ice road surface condition. Alternatively, a plurality of classifiers may be used where each classifier identifies whether a respective road surface condition is present or not. For example, a first classifier may determine whether the road surface includes water or no water; a second classifier determines whether the road surface includes ice or no ice; a third classifier may determine whether the road surface includes snow or no snow; and a fourth classifier may determine whether the road surface is dry or not dry. The plurality of classifiers include any number of classifiers required for a given number of road surface conditions that are to be analyzed. The analysis from each classifier may be performed concurrently or sequentially.

Support vector machine (SVM) classifiers include a set of related learning algorithms used for classification and regression. The learning algorithms are training methods that build models used to predict whether a new sample falls into one of the respective categories. The SVM model is a representation of categories of points in feature space and mapped so that the separate categories are divided by a clear gap. The support vector machine maps input data to a higher dimensional space where a maximal separating hyperplane is constructed. The support vector machine constructs the data into hyperplanes. The hyperplanes are constructed on each side of the separating hyperplane for separating the data. The separating hyperplane maximizes the distance between the two respective hyperplanes. A good separation is desired between the respective hyperplanes that have the largest spatial distance to the nearest training data points of any class. The basic concept is that the larger the distance between the two respective hyperplanes, the lower the misclassification rate will be when classifying the data to a respective class.

A Bayesian classifier is a general probabilistic approach for estimating an unknown probability density function recursively over time using incoming measurements and a mathematical process model.

The vehicle dynamic model module 32 provides a probability as to the degree of road friction between the road and the tire of the vehicle. The vehicle dynamics model provides a degree of road slickness that the vehicle is currently experiencing. The vehicle model-based module 32 utilizes a vehicle operating input 48, a dry reference model 50, a wet reference model 51, a snow reference model 52, and an ice reference model 53, a measurement sensing index device 54, a root-mean-squared-deviation module 56, and a probability percentage output 58. Indices are obtained from each of the respective reference models. The measurement sensing index device 54 compares its value with each of the indices calculated from all the reference models on dry, wet, snow, and ice. Four errors associated with four different surfaces will be generated. The four errors are outputted to the RMSD Analysis and generate four probabilities P(dry), P(wet), P(snow), P(ice), which will be input to the data fusion and decision making module.

To obtain an output from the vehicle dynamic model module 32, the vehicle operating input 48, such as a vehicle excitation, is required as an input. Examples of vehicle excitations include, but are not limited to, braking, acceleration, and steering. The purpose of utilizing the vehicle excitation is that for a known input, and output response can be obtained and analyzed for identifying the road surface condition. The vehicle operating input 48 is provided to the dry reference model 50, the wet reference model 51, the snow reference model 52, the ice reference model 53, and the measurement sensing index device 54.

The dry reference model 50 utilizes the vehicle operating input 48 and applies it to its model assuming that the road surface condition is dry. Similarly, the wet reference model 52 utilizes the vehicle operating input 48 and applies it to its model assuming that the road surface condition is wet. The measurement sensing index device 54 measures the actual response that the vehicle is experiencing given the vehicle operating input. Each of the outputs is provided to the root-mean-square-deviation analysis module 56 for calculating a respective probability percentage associated with each of the road surface conditions The output from the root-mean-square-deviation analysis module 56, including the respective probabilities on each of the road surface conditions, is output to the data fusion and decision making module 34 where the respective road surface condition having the largest probability is identified with the calculated probability. For example, a wet surface may be identified by the data fusion and decision making module 34 with its calculated probability if a determination is made wet surface has the largest probability after data fusion.

The probability percentage 46 output by the sensor-based module 30 includes four probabilities $P_s(dry)$, $P_s(wet)$, $P_s(snow)$, $P_s(ice)$ and the sum of the respective probability outputs is 1. Similarly, the probability percentage 58 output by the vehicle dynamic model module 32 includes four probabilities $P_d(dry)$, $P_d(wet)$, $P_d(snow)$, $P_d(ice)$ and the sum of the respective probability outputs is 1. The probability percentages 46 from the sensor-based module 30 and the probability percentages 58 from the vehicle dynamic model module 32 are input to the data fusion module 34. The data fusion and decision making module 34 is a decision-making module utilizing techniques that include, but are not limited to, dempster-shafer evidential technique, regression analysis and Bayesian analysis. The data fusion and decision making module 34 may provide details such as a surface state estimate that includes a confidence level/probability of its decision and also validates its decision based on the cooperative data supplied by the sensor-based module 30 and the vehicle dynamic model module 32.

The data fusion and decision making module 34 may utilize additional information from other sensing devices 59 that include information relating to, but not limited to, global positioning information, seasonal information, time of day, weather information, illumination information, humidity, temperature, precipitation, dew point, and air pressure.

The data fusion and decision making module 34 outputs the probability result of an identified road surface condition to various other systems for use in enabling safety features 60. Such safety features may include vehicle subsystems for countering the effects of the water. For example, in response to a determination that the road is wet, a controller may enable an electrical or electro-hydraulic braking system where a braking strategy is readied in the event that traction loss occurs. In addition to preparing a braking strategy, the braking system may autonomously apply a light braking force, without awareness to the driver, to remove precipitation from the vehicle brakes once the vehicle enters the precipitation. Removal of precipitation build-up from the wheels/brakes maintains an expected coefficient of friction between the vehicle brake actuators and the braking surface of the wheels when braking by the driver is manually applied. Other devices that may be enabled or disabled include speed control systems, traction control systems, cruise control systems, driver information warning systems, air intake systems, and communication systems. In addition to enabling safety features, the road surface condition may also be used for issuing warnings or alerts via an output device such as a display screen messaging system or other human machine interface which may include, but is not limited to, visual, audio, or haptic outputs.

To enhance the cooperative data fusion from the sensing-based module 30 and the vehicle dynamic model module 32, data fusion results are fed back to the online adaptive learning module 36. The online adaptive learning module 36 validates the results by improving the system capabilities to predict road surface condition reliability through adaption feedback. That is, the system constantly learns through feedback results. For example, a vehicle may detect an image of the road surface forward of the vehicle and protect the road surface condition. As the vehicle drives over the identified section of the road, the vehicle will utilize the vehicle-based model to predict the current road surface condition through an excitation-response technique. As the vehicle moves beyond the identified section of the road, a rear facing imaging device may capture the respective section of the road behind the vehicle. The image will be analyzed for determining the road surface condition, for example, by comparing the texture of the road surface image captured by the forward facing camera in the image captured by the rear facing camera to determine if the texture of the road surface varied. This further validates the original predicted results. In response to its adaptive learning, the online adaptive learning module 36 provides feedback for refining the sensing-based module 30 in the vehicle dynamic model module 32.

Refinements of the respective modules may include a tune feature submodule 62. The tune feature submodule 62 refines feature selection criteria used in the feature selection module 42. Determining which features to refine by the tune feature submodule 62 may be identified by utilizing AdaBoost, principal component analysis (PCA), independent component analysis (ICA), and recursive feature elimination (RFE).

AdaBoost is a machine learning algorithm, used in cooperation with various other learning algorithms to improve their performance. AdaBoost is adaptive in the sense that a next successive classifier is modified in light of those instances misclassified by previous classifiers. The previous classifiers used by AdaBoost can be weak classifiers (e.g., display a substantial error rate), but so long as the performance of the classifier is not random, it improves the overall classifier model.

Principal Component Analysis (PCA) and Independent Component Analysis (ICA) for reducing the data size and finding coherence among PID values.

PCA identifies a linear combination of variables that best describe variability in the dataset. The linear combination of variables is calculated by an eigenvector decomposition of a covariance matrix of the data. Linear combination of variables which describes the most variability (e.g., 90% of the total variance in the dataset) is used as basis vectors for transforming the data into a new reduced-dimensional space. Information is extracted regarding the redundancy in the dataset. Further, PCA is effective only under the assumption that the data has Gaussian distribution which may not be true for automotive systems because there are several nonlinear processes which could generate non-Gaussian data.

ICA is a non-linear technique to estimate statistically independent components from a data matrix. ICA is utilized for linear representation of non-Gaussian data so that the components are statistically independent, or as independent as possible. ICA is most effective in systems that are highly nonlinear where data is more likely to be non-Gaussian. Since data reduction has already been reduced utilizing PCA, ICA is applied to the PCA data output to check if any further reduction is possible.

RFE is a process by which models are repeatedly constructed and features that are identified to have low weights or less significant in the feature extraction are removed or discarded. For example, the brightness or shadows from an image may be discarded.

Refinements to the classifier 44 may be provided by a tune classifier submodule 64. The tune classifier submodule 64 refines the wet surface pattern in the classifier 44 with new image training data. The concept of voting or boosting with respect to the classifier may be utilized. Boosting applies to an area of predictive data mining to generate multiple models or classifiers (for prediction or classification), and to derive weights for combining the predictions from those models into a single prediction classification. Voting utilizes a plurality of classifiers where the results by the different classifiers are combined for predicting enhanced results. The results from the different classifiers may be averaged or weighted.

Refinements to the vehicle-based model 32 may be performed by a tune vehicle model parameter submodule 66. The tune vehicle parameter submodule 66 identifies opportunities and how parameters within the various models may be updated for enhancing their overall model. For example, if a driver steering input is utilized, then the tune vehicle parameter submodule 66 may recommend that a steering excitation threshold be reduced. Another example may be to update wet surface parameters through an online recursive least square parameter estimation. Such wet surface parameters may include, but is not limited to, cornering stiffness ($C_f$ and $C_r$) for the front axle and the rear axle for a wet surface.

Data from the other sensing devices 59 may be further provided to the sensing-based module 30 and the vehicle dynamic model module 32. The data may be cooperatively used by each respective module in determining the respective probabilities relating to the wet surface condition.

While certain embodiments of the present invention have been described in detail, those familiar with the art to which this invention relates will recognize various alternative designs and embodiments for practicing the invention as defined by the following claims.

What is claimed is:

1. A method for determining a road surface condition for a vehicle driving on a road, the method comprising the steps of:
   determining, by a first probability module, probabilities associated with a plurality of road surface conditions based on an image of a capture scene of the road;
   determining, by a second probability module, probabilities associated with the plurality of road surface conditions based on vehicle operating data;
   inputting the probabilities determined by the first probability module and probabilities determined by the second probability module to a data fusion and decision making unit for fusing the probabilities determined by the first and second probability modules;
   determining a road surface condition based on fused results by the data fusion and decision making unit;
   outputting a refined probability associated with the identified road surface condition from the data fusion and decision making unit that is a function of the fused first and second probabilities; and
   providing the refined probability from the data fusion and decision making unit to an adaptive learning unit, the adaptive learning unit generating output commands that refine tunable parameters of at least the first probability module and the second probability module for determining the respective probabilities.

2. The method of claim 1 wherein determining the probabilities by the first probability module comprises the steps of:
   detecting a scene exterior of the vehicle by an image capture device;
   identifying a section of the road in the first captured image by a processing unit;
   analyzing, by the processor, the section of the road for determining the probabilities of each of the plurality of road surface conditions.

3. The method of claim 2 wherein analyzing the section of the road for determining the probabilities of the each of the plurality of road surface conditions comprises the steps of:
   extracting features from sections of the road in the image for analysis by the processor;
   inputting the extracted features to a classifier for determining the probabilities for each road surface condition.

4. The method of claim 3 wherein the adaptive learning unit generating output commands that refine tunable parameters of the first probability module includes generating commands for refining a feature selection process.

5. The method of claim 4 wherein the refining a feature selection process includes applying an AdaBoost machine learning technique for applying feature extraction.

6. The method of claim 4 wherein the refining a feature selection process includes applying principal component analysis for applying feature extraction.

7. The method of claim 4 wherein the refining a feature selection process includes applying recursive feature elimination for applying feature extraction.

8. The method of claim 3 wherein the adaptive learning unit generating output commands that refine tunable parameters of the first probability module includes generating commands for refining the classifier.

9. The method of claim 8 wherein generating commands for refining the classifier includes refining a road surface condition pattern with new image training data.

10. The method of claim 1 wherein determining the probabilities by the second probability module comprises the steps of:
monitoring vehicle operating conditions by a vehicle sensing device;
generating an excitation that alters the vehicle operating condition for obtaining a vehicle response;
inputting the excitation and the vehicle response to the vehicle reference model; and
determining the probabilities of each of the plurality of road surface conditions based on an output from the vehicle reference model.

11. The method of claim 10 wherein the adaptive learning unit generating output commands that refine tunable parameters of the second probability module includes generating commands for refining vehicle model parameters.

12. The method of claim 10 wherein generating commands for refining the vehicle model parameters includes reducing a steering excitation threshold of the vehicle model.

13. The method of claim 10 wherein generating commands for refining the vehicle model parameters includes updating road surface condition parameters of the vehicle model.

14. The method of claim 13 wherein updating the road surface condition parameters of the vehicle model is performed though online recursive least squares parameter estimation.

15. The method of claim 1 wherein the data fusion unit applies regression analysis to the probability inputs.

16. The method of claim 1 further comprising the step of obtaining exterior climate conditions from a remote source, wherein the exterior climate conditions are input to the data fusion unit for determining the refined probability of the road surface condition.

17. The method of claim 1 further comprising the step of obtaining rain sensor data from a vehicle rain sensor, wherein the rain sensor data is input to the data fusion unit for determining the refined probability of the road surface condition.

18. The method of claim 1 further comprising the step of obtaining global positioning data from a global positioning device, wherein the global positioning data is input to the data fusion unit for determining the probability of the road surface condition.

19. The method of claim 1 further comprising the step of obtaining temperature data from a vehicle-based temperature sensor, wherein the rain temperature sensor data is input to the data fusion unit for determining the refined probability of the road surface condition.

20. The method of claim 1 further comprising the step of obtaining road surface temperature data from a vehicle-based road temperature sensor, wherein the road surface temperature sensor data is input to the data fusion unit for determining the probability of the vehicle driving on each road surface condition.

21. The method of claim 20 wherein each of the road surface conditions are pre-categorized road surface conditions.

22. The method of claim 1 further comprising the step of generating a road surface condition indication signal by an output device that relates to the type of road surface condition output by the data fusion unit.

23. The method of claim 22 wherein a dry road surface condition indication signal is generated by the output device.

24. The method of claim 22 wherein a wet road surface condition indication signal is generated by the output device.

25. The method of claim 22 wherein an ice road surface condition indication signal is generated by the output device.

26. The method of claim 22 wherein a snow road surface condition indication signal is generated by the output device.

27. The method of claim 1 wherein the data fusion unit applies dempster-shafer evidential technique to the probability inputs.

28. The method of claim 1 wherein the data fusion unit applies bayesian decision technique to the probability inputs.

* * * * *